(12) United States Patent
Betouin et al.

(10) Patent No.: US 7,984,320 B2
(45) Date of Patent: Jul. 19, 2011

(54) SILENT TIME TAMPERING DETECTION (75) Inventors: Pierre Betouin, Paris (FR); Mathieu Ciet, Paris (FR); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 753 days.

(21) Appl. No.: 12/058,432

(22) Filed: Mar. 28, 2008

(65) Prior Publication Data

US 2009/0249108 A1 Oct. 1, 2009

(51) Int. Cl.
*G06F 7/04* (2006.01)
*G06F 15/173* (2006.01)

(52) U.S. Cl. ........ 713/502; 713/178; 713/187; 713/194; 726/26

(58) Field of Classification Search .................. 713/178, 713/187, 194, 502; 726/26
See application file for complete search history.

(56) References Cited

U.S. PATENT DOCUMENTS

| | | | | |
|---|---|---|---|---|
| 6,671,608 B2* | 12/2003 | McKenzie et al. | ............... | 701/93 |
| 7,509,421 B2* | 3/2009 | Lambert | ....................... | 709/226 |
| 7,861,308 B2* | 12/2010 | Strohwig et al. | ................ | 726/26 |
| 2009/0089398 A1* | 4/2009 | Lambert | ....................... | 709/217 |
| 2010/0011214 A1* | 1/2010 | Cha et al. | ....................... | 713/175 |
| 2011/0041186 A1* | 2/2011 | Strohwig et al. | ................ | 726/26 |

* cited by examiner

*Primary Examiner* — Abdelmoniem Elamin
(74) *Attorney, Agent, or Firm* — Morrison & Foerster LLP (57) ABSTRACT

Computers and other electronic devices typically include a timing operation such as a clock in an operating system. It is anticipated that hackers may tamper with this clock. This tampering might be especially advantage in the context of systems which provide for rental of audio and video content, such as movies. Tampering with the system clock on the playing device would allow an extension of the rental period to the detriment of the provider of the rental content. Hence the present method is directed to detecting clock modifications both in terms of time shifting and clock rate tampering. This detection is done using digital signal processing.

17 Claims, 9 Drawing Sheets

SILENT TIME TAMPERING DETECTION

FIELD OF THE INVENTION

This disclosure relates to computer and data security, operating system security, and preventing tampering with operating and hardware timing operations.

BACKGROUND

Time is a critical component of computer enabled DRM (Digital Rights Management) systems, especially when they are implemented on top of untrusted environments (such as computer operating systems such as Microsoft Windows, Linux, Macintosh Operating System, or hardware in consumer electronic devices). Since users can fully interact with and access those systems, they are able to fake, replace, tamper, or remove some of the timing related operations performed or used by the DRM system.

Timing operations are managed by the operating system itself. User space processes (software) ask the operating system kernel (ring zero) for a time request (performing the SYS_gettimeofday system call, for instance, in the Macintosh operating system Leopard). Therefore there are many ways to return faked or tampered time indications to user space processes. These actions can be performed without modifying the targeted process virtual memory spaces using for instance API hooking or kernel patches as well known in the field. This is one of the most critical threats to the integrity of content (audio and video) rental DRM systems since one needs to ensure that time has not been modified or its rate changed (in order to pass slower for instance).

SUMMARY

The present time tampering detection method and apparatus are dynamic and do not necessarily provide persistency to system reboots or shutdowns. On untrusted platforms, the scope of this protection may be limited to the protected running routine, which may be either a user process or a kernel routine (embedded in the operating system kernel or through a kernel extension/driver). However, it may be adapted on hardware (circuitry) to provide persistency. Adding persistency to the present method can be provided by storing the information in a secure memory. This can be done especially in "trusted" environments such as Smart cards or secured embedded devices.

In any case of time modification detection, the goal of such detection is to ensure that it is strong enough so that an attacker has to perform many modifications or workarounds in order to roll back to a normal and fully functional operating system.

Digital rights management is well known in the computer and consumer electronics field. It is typically used by content providers in order to prevent hacking or misuse of protected that is proprietary or copyrighted content such as audio or video material, such as movies, songs, etc. There are many aspects to DRM, including encryption and other techniques. The present method in one illustrative embodiment is directed to ensuring that restrictions on rental of content, such as movie rentals when delivered in the form of a digital file to the user, are maintained. Typically such on-line rentals are for limited periods of time. For instance, a typical movie rental delivered by an online (Internet) website is for a total duration of 30 days during which the movie can only be viewed for a particular 24 hour time window. However it is anticipated that hackers will try to corrupt this so as to allow viewing over a longer time window or greater than, e.g., 30 days. This is undesirable since it will deny revenue to the provider of the content. In another illustrative embodiment, the present method is used in cryptography to ensure that a certificate is no longer actually valid.

Hence the present method is directed towards solving the above stated problem of detecting any of tampering, faking, replacement or removal relating to timing operations. These timing operations are also referred to as a "timer" or "time" or "clock" or "clock signal" in the field. The present method is directed towards taking time samples of the operating system or other clock which is being monitored and applying digital signal processing techniques to determine any corruption (tampering) in the clock. Two main types of corruptions are detected here. The first is clock rate tampering. The second is time shifting, which means changing the clock value without modifying the clock rate in the past or in the future. Different techniques are employed for detecting each of these. The present method also provides an incremental way to check for clock (timing) modifications with a limited number of past records. Thereby a very long period of time may be covered with a limited quantity of stored data.

DETAILED DESCRIPTION

The present method applies digital signal processing to clock change detection, using signal modulation and frequency transposition. One cannot guarantee that the current method's routine will be executed at accurate time intervals since it is not necessarily implemented on top of a real-time operating system. The method must therefore deal with time latencies. Timers are used here as accurate enough to provide the information required.

Figure 1:
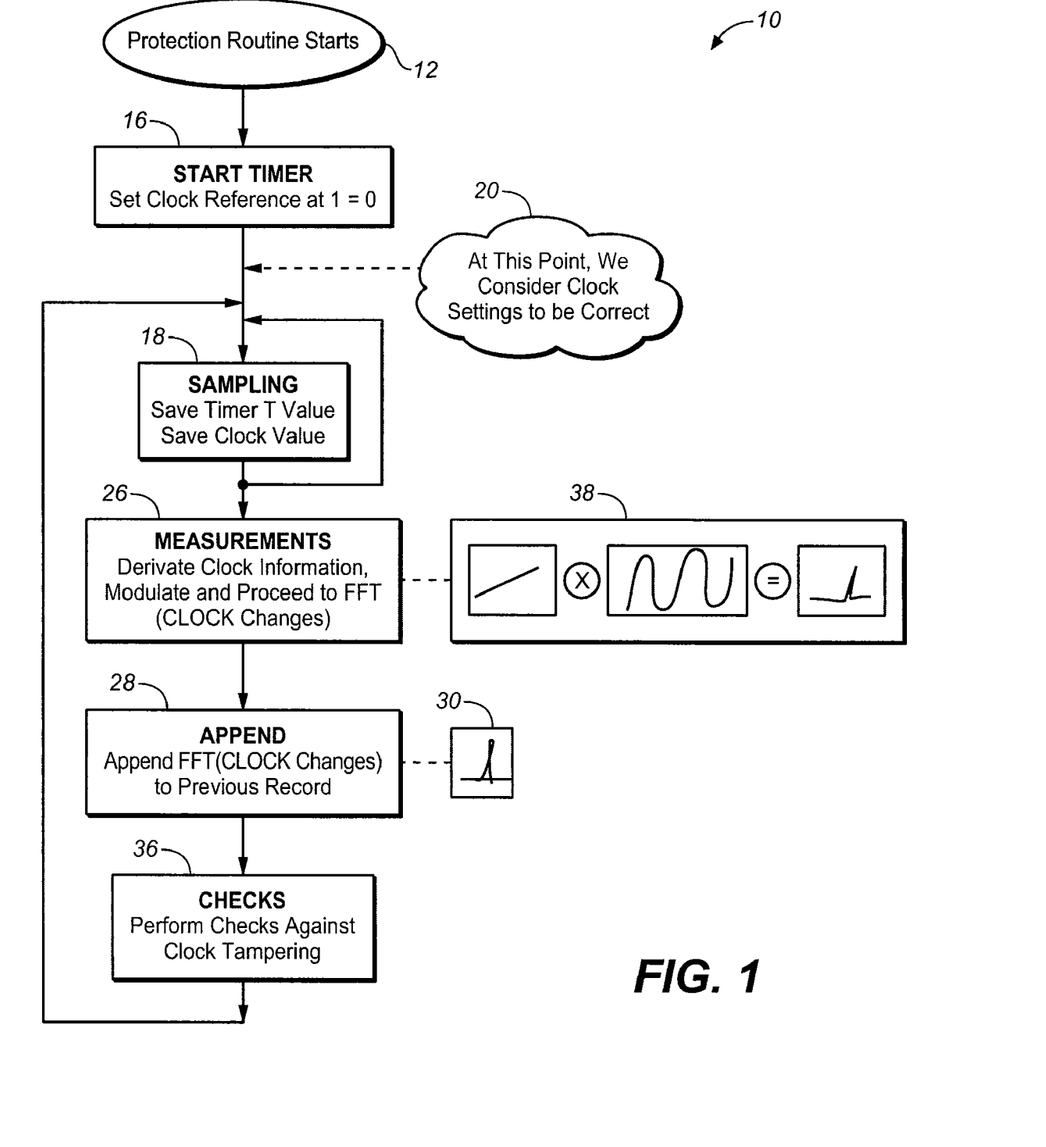
FIG. 1 shows a flow chart of the present method.

The following steps illustrated in FIG. 1 are implemented by the present method which is implemented by routine 10 which starts at 12:

At d0 (at time t0=0), start a timer 16, hereafter referred to as "Timer". This is actually the first time routine 10 is executed.

At repetitive sampling intervals, not exactly defined as explained above, one takes time clock measures at 18 and the associated values of Timer. Then both are stored into a SAMPLES_NUMBER long memory array. This array is referred to as ƒ(t)=currentDate.

When the array f(t) is fully filled (as determined by a variable referred to here as SAMPLES_NUMBER entries), the derivative f'(t) of f(t) is computed at 26 in FIG. 1 and then the function g(t)=ƒ'(t) t+ƒ'(t)=ƒ'(t) (t+1) is computed. See FIG. 2 showing a graph of these functions, but using "x" for t.

Figure 2:
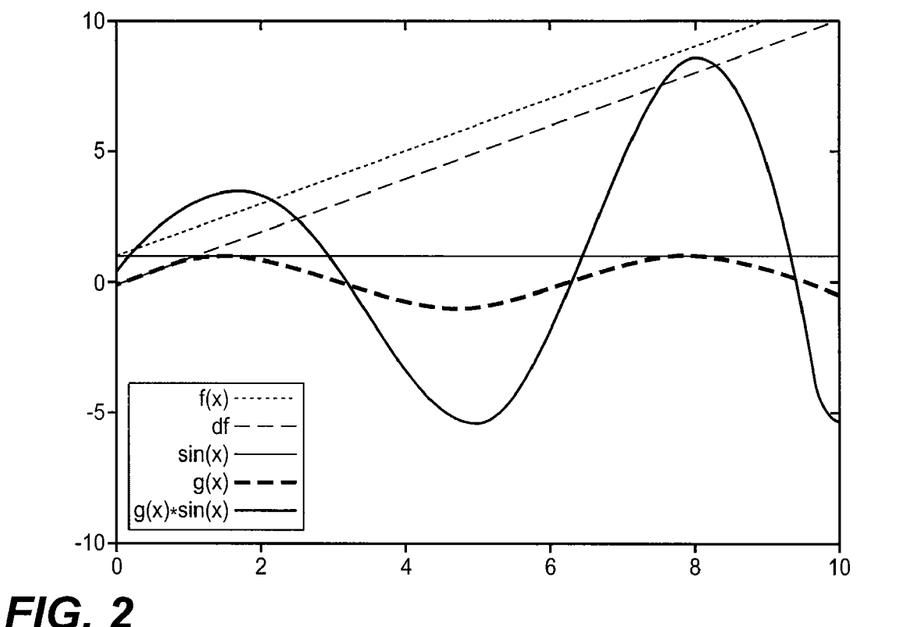
FIG. 2 shows a graph of various timing functions in accordance with this disclosure.

Since the timer and clock values should be proportional between each other as shown in FIG. 2:

ƒ(t) should be an affine function;
ƒ'(t) should be constant;
g(t) should be an affine function (a t+b) in most cases but not if there is tampering, see below.

Figure 3:
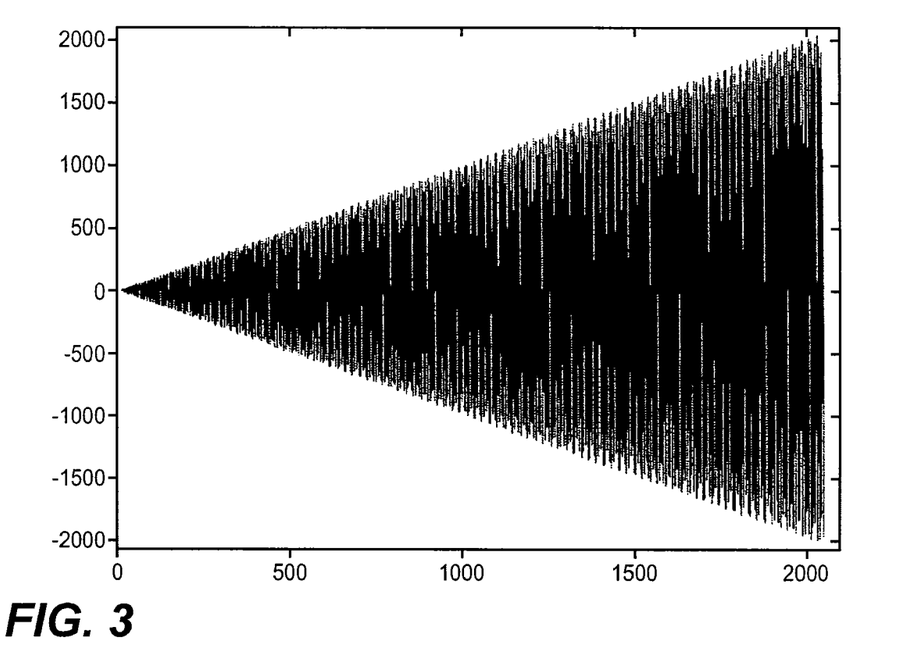
FIG. 3 shows a modulated form of the graph of FIG. 2.

Next, modulate the function g(t) at 26 in FIG. 2 with a well known periodic (time varying) signal (of frequency f0). Take the example of a sin(t) carrier wave as the periodic signal. Let h(t) be the modulated signal. In the usual case, without clock tampering being present, the resulting modulated signal h(t) (graphed in FIG. 3) would be h(t)=(ƒ'(t) t+ƒf'(t)). sin(t).

Figure 4:
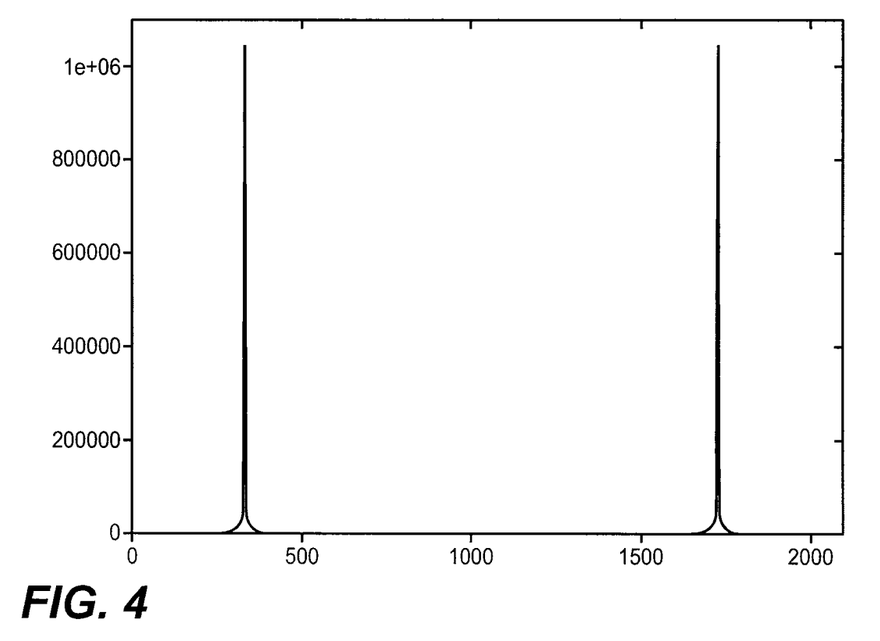
FIG. 4 shows a Fast Fourier Transform of the signal of FIG. 3.

In order to keep track of the previous information (since only a maximum of SAMPLES_NUMBER values are stored), next one performs a Fourier Transform or equivalent, referred to here generically as a Fourier Transform (which is, e.g., a Fast Fourier Transform, hereafter "FFT") in order to switch to the corresponding frequency representation. (The FFT is an algorithm to compute the discrete Fourier Transform, and is well known in digital signal processing. The FFT is one type of Fourier Transform, which generally transforms one function, here the timing signal, into a frequency representation. Other suitable non-Fourier transforms may be used, such as other types of Fourier analysis or other transform types such as Laplace, Mellin, two-sided Laplace, Hartley, Chirplet, Hankel or others, all of which are well known in the field) The previous signal has the corresponding representation as shown in FIG. 4 showing a frequency representation of h(t) using a FFT.

Figure 5:
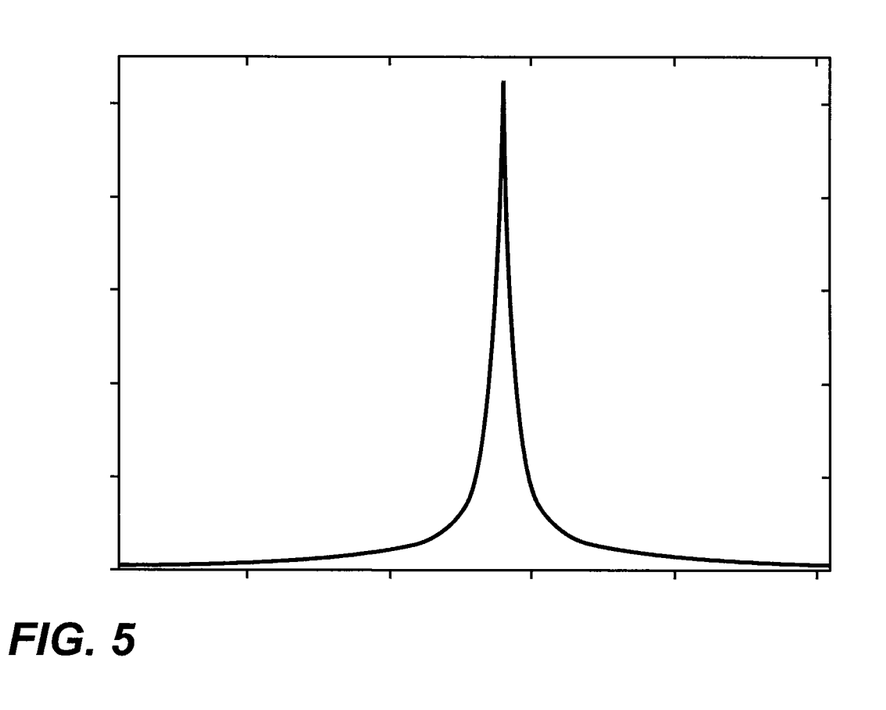
FIG. 5 shows a close-up of a portion of FIG. 4.

Max(FFT(h(t))) is a constant and predictable value. A focus on this f0 peak in FIG. 5 shows that intensity/frequency is always growing until it reaches Max(FFT(h(t))). In this example, SAMPLES_NUMBER=2048. The peak appears at sample 327, whereby (peak/SAMPLE_NUMBER)=(327/2048)=0.159=1/(2*pi)=carrier wave frequency.

For future measurements, resulting frequency representation are added to the previous ones as shown at 30 in FIG. 1. The peak should remain at the same frequency, and the intensity will be appended.

During initialization at 16 in FIG. 1, a clock reference is chosen, and this value is considered as correct at 20 in FIG. 1 since it was chosen as a reference. Additional protection/enforcement may be needed to ensure that this information has not been faked or tampered with.

When timer T is started at 16, the first clock value retrieved will be used as f(t0), for t=0. Subsequent values of the timer (referred to as t(n)) do not need to be taken at equal intervals.

The detection at 36 in FIG. 1 of the clock rate tampering or time shift (changing clock value without modifying clock rate, in the past or in the future) is performed on the frequency representation, which is FFT(h(x)) as follows:

1. A first check (test) is performed on (maxFreq, maxIntensity)=max(FFT(h(x))). This check ensures that maxFreq is equal to frequency f0.

2. A second check consists in ensuring that, from frequencies 0 to f0 (the frequency peak), the graph of the derivative of function FTT(h(x)) is never negative.

The associated software pseudo-code to do these checks is expressed as:

```
(maxFreq, maxIntensityy = max(FFT(h(t)));
d = d(FFT(h(t))) / dx;
if ((maxFreq != f0) ||
    (min(d(x)) <= 0))
  TEST_FAILED( );
```

A major advantage of this method is the possibility to track clock modifications over a very long period, using only a limited SAMPLES_NUMBER array at 30 in FIG. 1. Saving frequency information instead of temporal information allows one to superimpose past entries to new ones, without loss of margin reduction on the detection algorithm 36. This is performed at 28 in FIG. 1.

Figure 6:
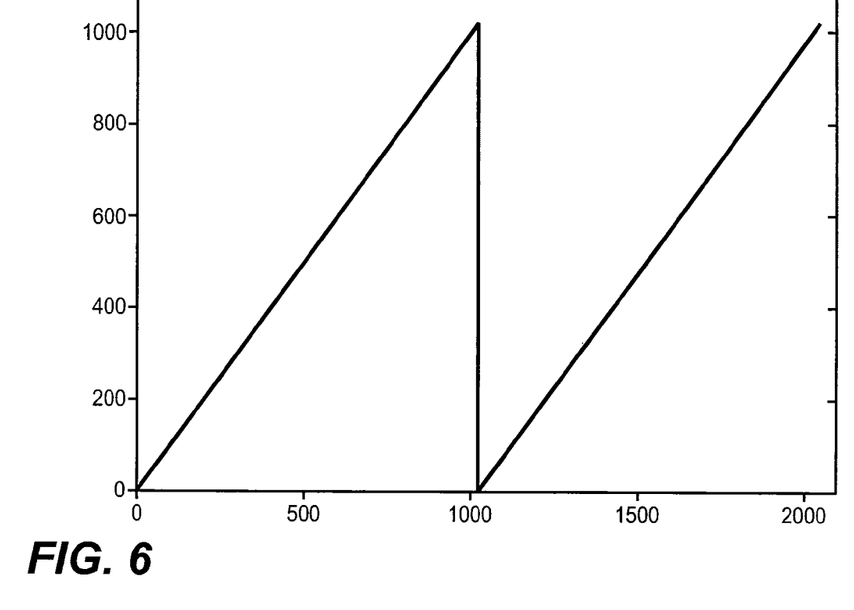
FIG. 6 shows the effects of a time shift attack prior to detection.
Figure 7:
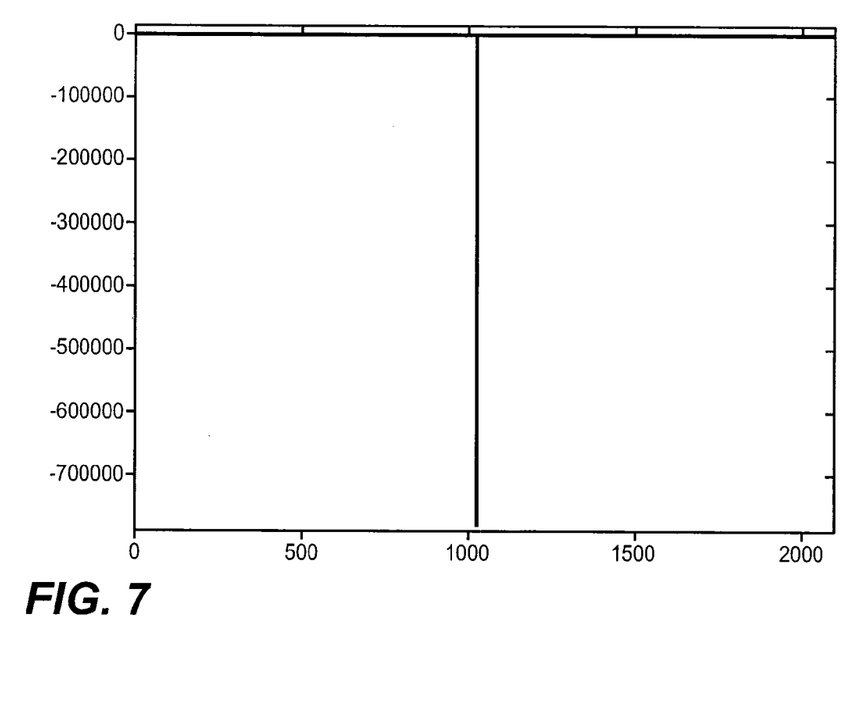
FIG. 7 shows a signal derived from the timing signals of FIG. 6.
Figure 8:
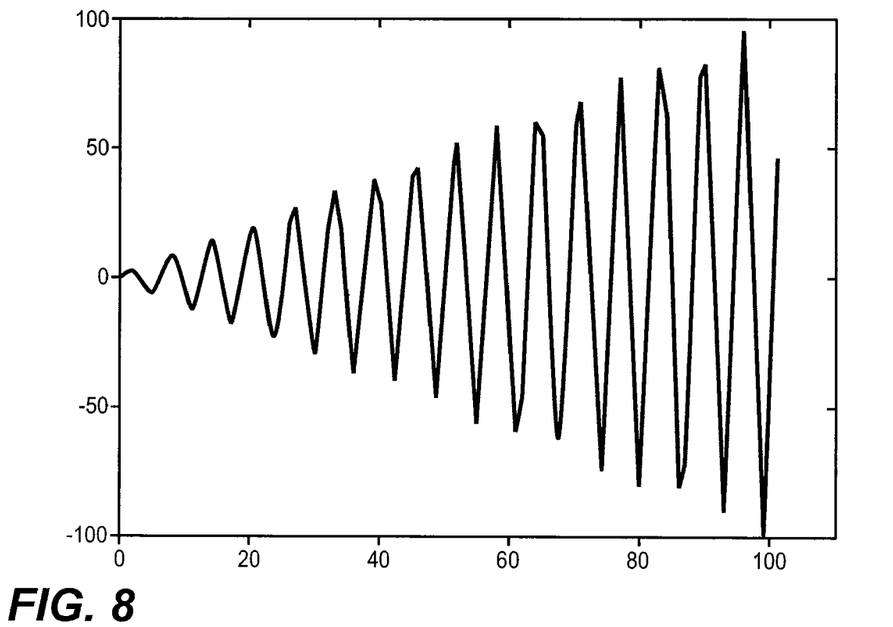
FIG. 8 shows a close-up of a portion of FIG. 6.

FIG. 6 shows graphically the time signal as a result of an attacker's time shift attack, consisting in shifting time f(t) in the past or in the future. Sample #1024 indicates the attacker's clock signal (timing) modification here. After the FIG. 6 signal is derivated and modulated, the resulting signal is h(t), which is obviously discontinuous at sample #1024, as shown in FIG. 7. A close up view of FIG. 7 to the beginning of the temporal signal shows a "standard" (non-tampered) modulated plot (for sample 1 to sample 100) in FIG. 8. The discontinuity when the time shift occurs is clearly visible on a close-up of the h(t) plot in FIG. 9 (for sample 900 to sample 1100).

Figure 9:
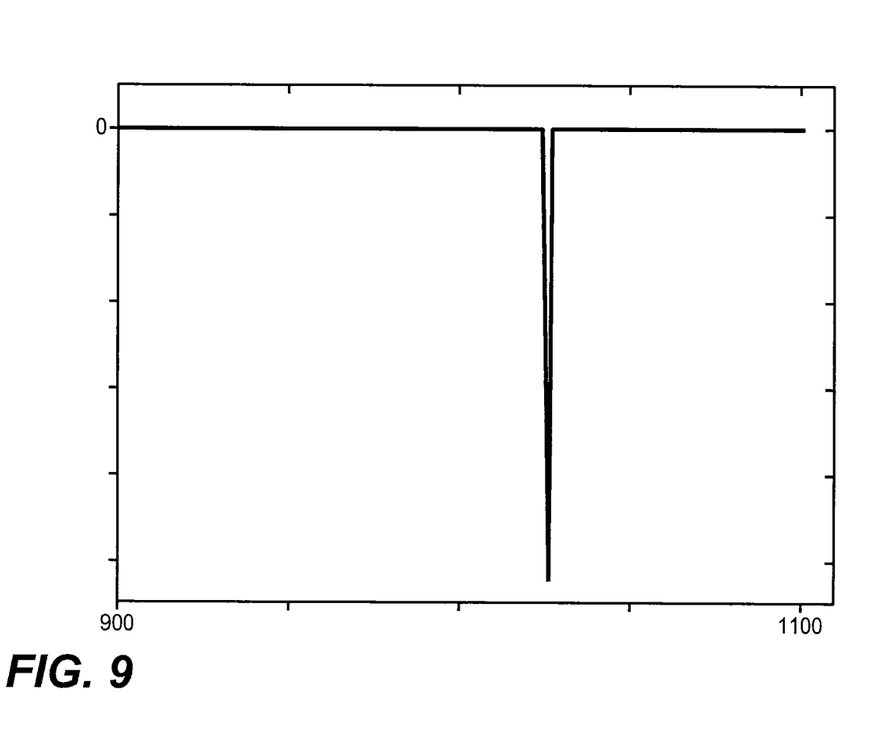
FIG. 9 shows a discontinuity in a time shift.
Figure 10:
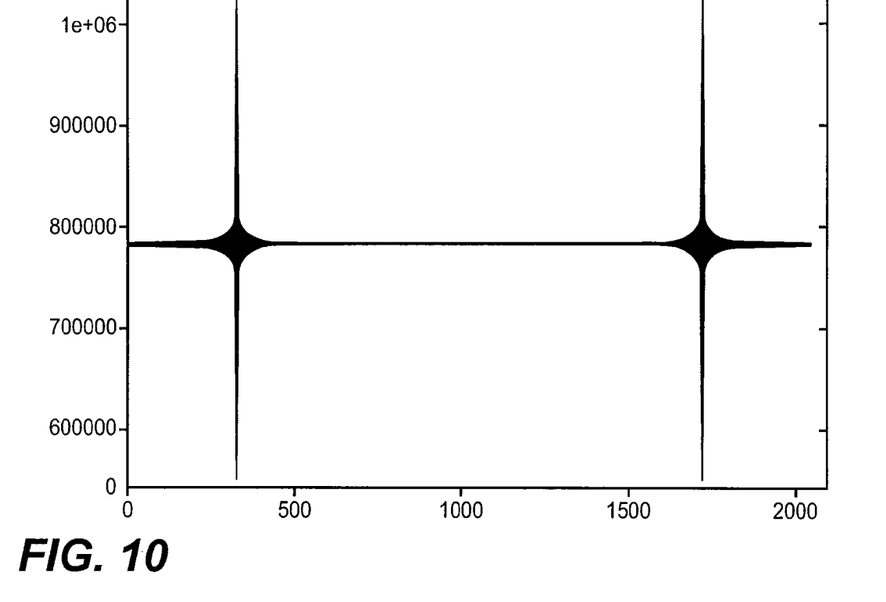
FIG. 10 shows a Fast Fourier Transform of the signal of FIG. 9.
Figure 11:
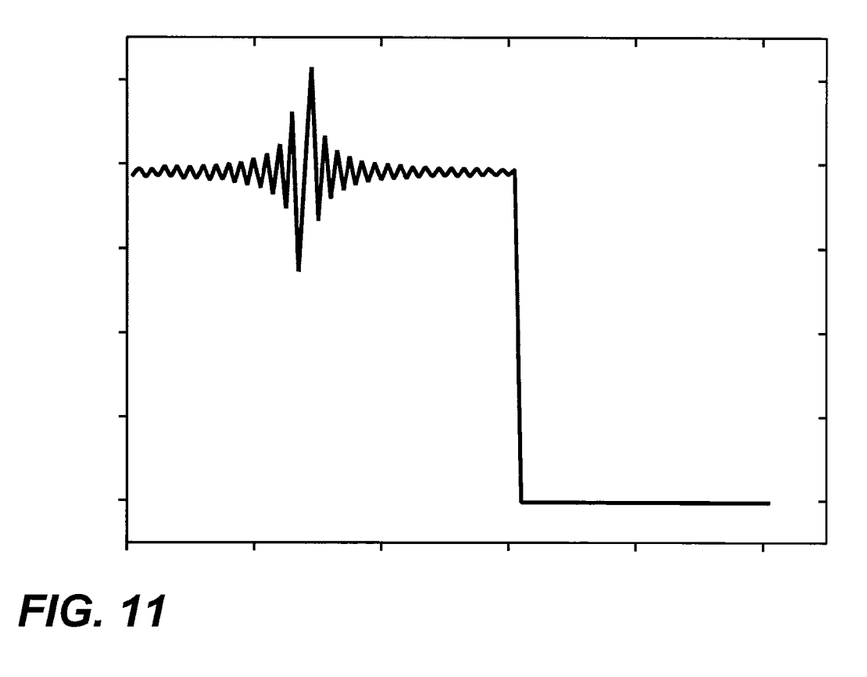
FIG. 11 shows a close-up of a portion of FIG. 10.

The Fast Fourier Transform graph in FIG. 10 of the FIG. 9 signal puts the stress on the signal discontinuity and one can easily observe that it does not have the properties to pass the detection tests (explained above). This is even more visible on a close-up of FIG. 10 as shown in FIG. 11.

Figure 12:
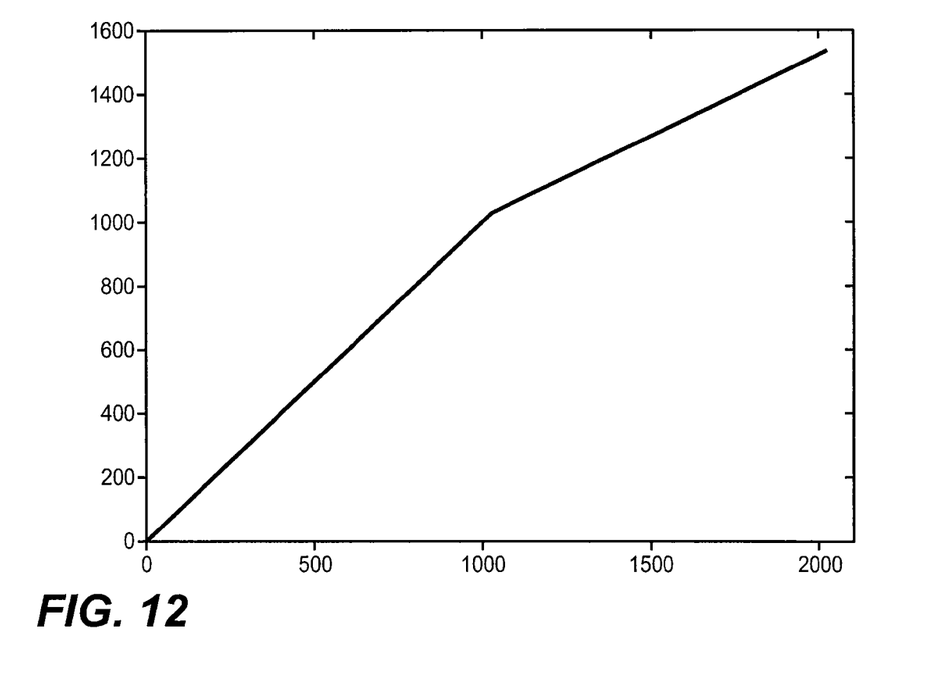
FIG. 12 shows the effect of clock rate tampering in a graph.
Figure 13:
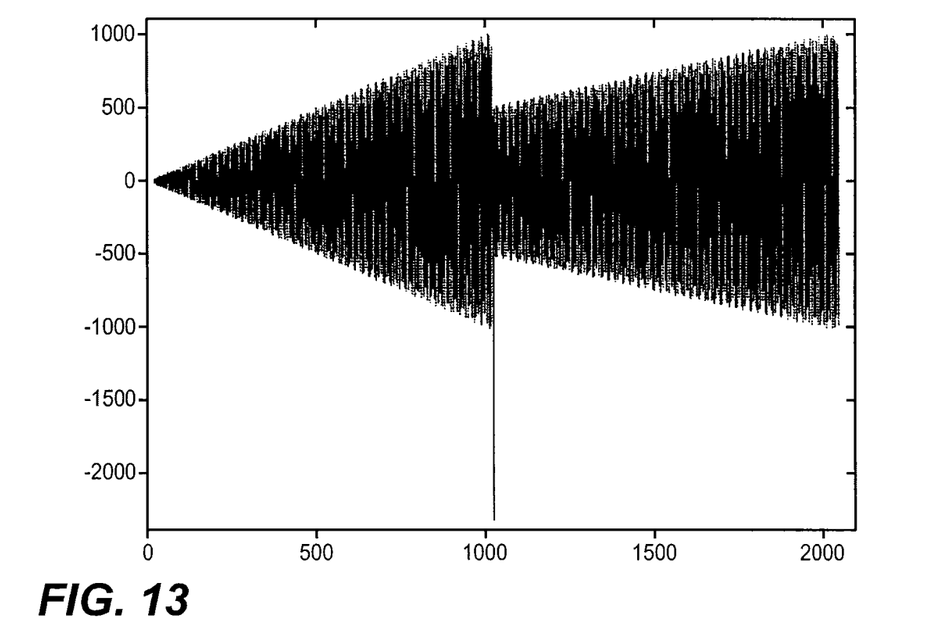
FIG. 13 shows a signal derived from that of FIG. 12 to detect tampering.
Figure 14:
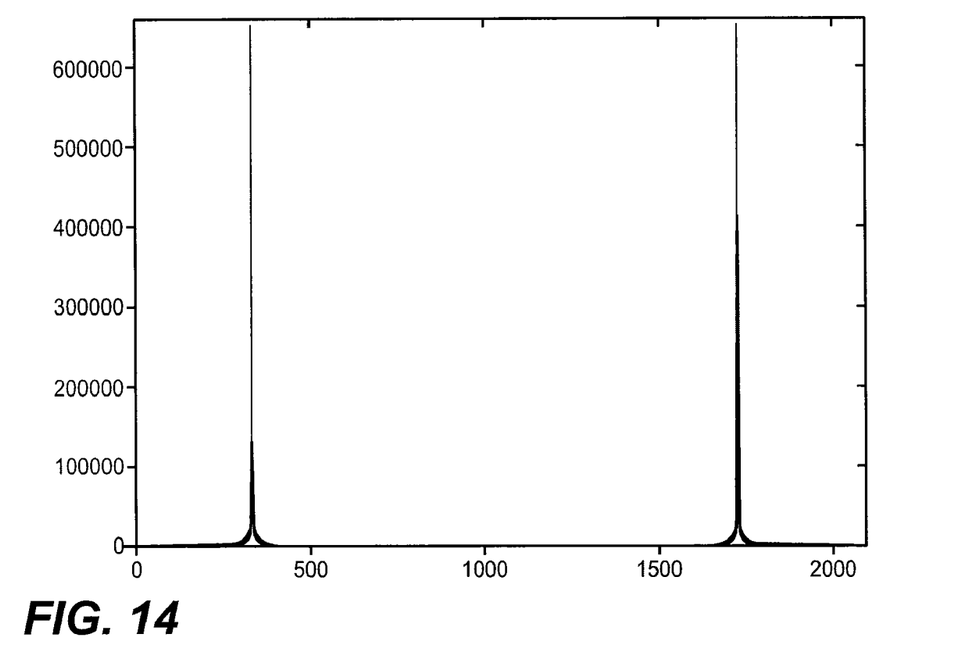
FIG. 14 shows a Fast Fourier Transform of the signal of FIG. 13.
Figure 15:
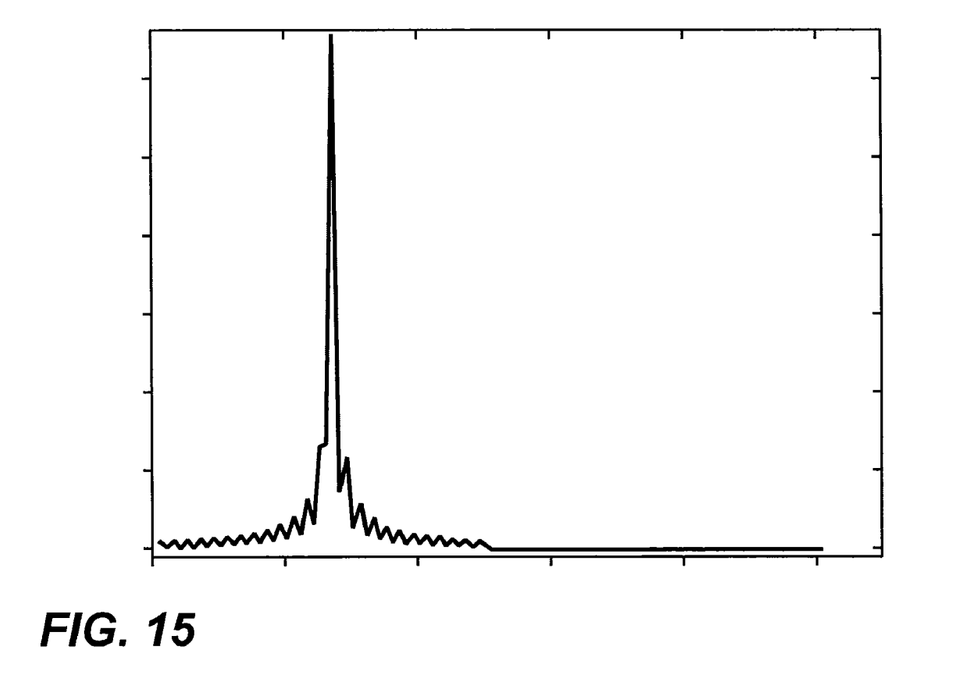
FIG. 15 shows a close-up of a portion of FIG. 14.

The clock rate tampering attack consists of changing the rate of the system clock. Most of the time this attack would be useful in lowering the clock rate to simulate a lower date. In FIG. 12, the clock rate is modified by an attacker at sample #1024. After the FIG. 12 signal is derivated and modulated as in FIG. 1 at 26, one obtains the resulting graph of FIG. 13 from FIG. 12. The discontinuity is due to the use of the ƒ'(t) (t+1) function, instead of ƒ'(t). In a frequency (FFT) representation as shown in FIG. 14, the FIG. 13 signal seems quite "standard". A closer look at FIG. 14 shows that the detection operation described above detects an obvious non-growing frequency value from 0 to the maximum frequency (f0) as shown in the close-up of the frequency f0 peak of FIG. 14, shown in FIG. 15.

Given a known hardware platform for the operating system, persistency of the present method can be implemented using non-volatile and secure memory storage for the data, other than a hard disk drive (which is generally not secure). This provides secure persistency for system reboots and shutdowns.

Variables, parameters and constants referred to in this disclosure are as follows:

| Name | Type | Explanation |
|---|---|---|
| Timer | Integer | System timer, started at the first instance of the protection routine. |
| d0 | Integer | Date (clock) value when timer is started. |

-continued

| Name | Type | Explanation |
| --- | --- | --- |
| t0 | Integer | t0 = 0: first value of the timer. |
| f0 | Float | Frequency of the modulating signal. |
| SAMPLES_NUMBER | Integer | Number of samples needed before applying the Fourier Transform. When SAMPLES_NUMBER is reached, the frequency transposition is saved and the counter is reset. |
| maxFreq | Float | maxFreq is the maximum X-coordinate value found on FFT(h(t)). |
| maxIntensity | Float | maxIntensity is the maximum Y-coordinate value found on FFT(h(f)). |

These may be used in a computer program (software) which embodies the present method, coding of which (e.g., in the "C" computer language) would be routine in light of this disclosure. Also contemplated in addition to the method are such a computer program and a computer readable media storing the code for carrying out the computer program, as well as a programmed computer or computing device or other electronic device which would carry out this method in software or hardware (circuitry).

Figure 16:
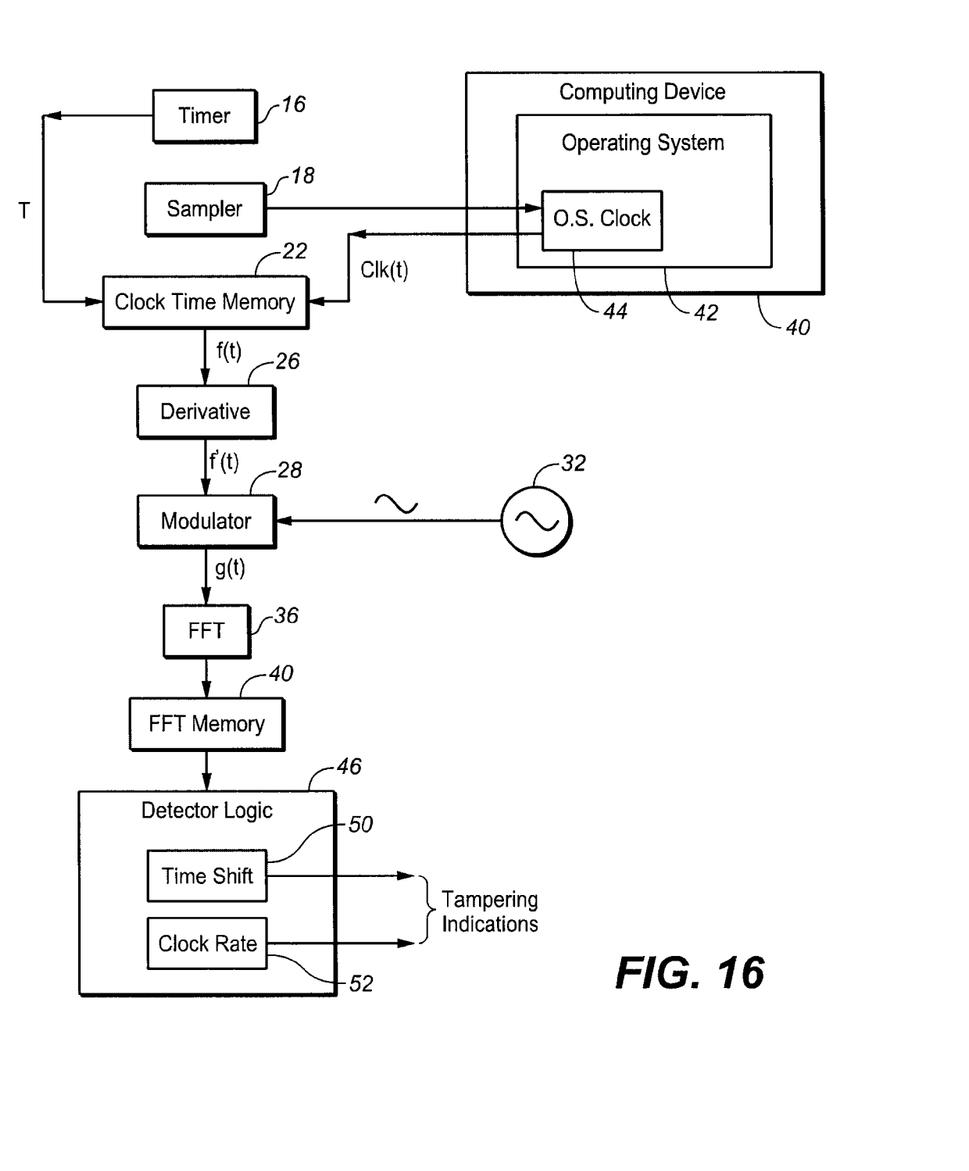
FIG. 16 shows in a block diagram an apparatus for carrying out the present method.

FIG. 16 shows in a block diagram form the associated apparatus and its environment. The environment is that of a computing device (host system) 40 which may be a computer, computing device or consumer electronics device, which in this case has an operating system 42 including an operating system clock 44 or equivalent. There need not be an operating system; the operating system and its clock here are an example of a conventional timing operation present in computers, computing devices and other electronic devices which may be tampered with or subject to tampering. The apparatus in accordance with the invention is shown in the left hand portion of FIG. 16 and begins with the timer 16 (also shown in FIG. 1). The next element is the sampler 18 also shown in FIG. 1 which samples the operating system clock at intervals determined by timer 16. The resulting signal CLK(t) is input to the clock time memory which saves the timer t value and the clock value f(t) at 22. The resulting signal f(t) is subject then to the taking of a derivative thereof by a derivator 26. The derived value f'(t) is then subject to modulator 28 which receives a periodic signal (the carrier) from periodic signal source 32 and multiplies f'(t) by the periodic signal. The resulting signal g(t) referred to above is then subject to a Fast Fourier Transform element which calculates the FFT of g(t) at 36. The resulting FFT values are saved in the FFT memory 40. This memory then is addressed by the detector logic 46 which operates as above and has two detection mechanisms, the first of which is the time shift detection 50 and the second of which is the clock rate tampering detection 52. This provides tampering indications which may be used by the host system 40 for instance to prevent further viewing of a piece of rental content or otherwise to inhibit the tampering with the timing signals.

This disclosure is illustrative and not limiting; further embodiments and modifications will be apparent to those skilled in the art in light of this disclosure and are intended to fall within the scope of the appended claims.

What is claimed as new and desired to be protected by Letters Patent of the United States is:

1. A computer enabled method of detecting tampering with a timing operation in a computing device, comprising the acts of:
   providing a timer;
   starting the timer;
   saving a plurality of values of the timer and associated time values of the timing operation;
   taking a derivative of the saved time values;
   modulating the derivative of the time values with a periodic signal;
   calculating at least one transform value of the modulated derivative;
   saving the calculated transform values; and
   determining if the timing operation has been tampered from the saved transform values.

2. The method of claim 1, wherein the timing operation is in an operating system executed on the computing device.

3. The method of claim 1, wherein the timing operation is executed on circuitry associated with the computing device.

4. The method of claim 2, wherein the timing operation is the operating system clock.

5. The method of claim 1, further comprising the act of assigning a clock reference value prior to saving the time values.

6. The method of claim 1, wherein the transform is a Fourier analysis transform.

7. The method of claim 6, wherein the transform is a Fast Fourier Transform.

8. The method of claim 1, wherein the periodic signal is a carrier wave signal.

9. The method of claim 1, wherein the saved plurality of time intervals are taken at unequal intervals of the timer.

10. The method of claim 1, wherein the act of determining if the timing operation has been tampered includes determining a time shift in the timing operation.

11. The method of claim 10, wherein the act of determining includes:
    finding a maximum frequency in the saved transform values; and
    comparing the maximum frequency to a frequency of the periodic signal.

12. The method of claim 1, wherein the act of determining if the timing operation has been tampered includes determining a rate change in the timing operation.

13. The method of claim 12, wherein the act of determining includes:
    finding a negative derivative of the saved transform values.

14. The method of claim 1, wherein the time values are saved in a non-volatile memory.

15. A computer readable medium storing computer code for performing the method of claim 1.

16. A computing device programmed to perform the method of claim 1.

17. Apparatus for detecting tampering with a timing operation in a computing device, the apparatus comprising:
    a timer;
    a sampler coupled to the timer to sample time values of the timing operation as determined by the timer;
    a first memory coupled to the sampler to save a plurality of values of the timer and the associated sampled values of the timing operation;

a source of a periodic signal;

a derivator coupled to the first memory to calculate a derivative of the saved sampled values;

a modulator coupled to the derivative and the source of the periodic signal to modulate the derivative with the periodic signal;

a transform element coupled to the modulator to calculate transform values of the modulated derivatives;

a second memory coupled to the transform element to store the transform values; and a detector coupled to the second memory to determine if the timing operation has been tampered.

* * * * *